Nov. 9, 1965  M. J. DIOTALEVI ETAL  3,216,711
BLAST FURNACE PRESSURIZED BY JET ENGINE GAS
Filed July 6, 1962

INVENTORS
MARIO J. DIOTALEVI
CLIFFORD L. HAYDEN
BY Charles A. Warren
ATTORNEY

United States Patent Office 3,216,711
Patented Nov. 9, 1965

3,216,711
BLAST FURNACE PRESSURIZED BY JET ENGINE GAS
Mario J. Diotalevi, Somers, and Clifford L. Hayden, East Hartford, Conn., assignors to United Aircraft Corporation, East Hartford, Conn., a corporation of Delaware
Filed July 6, 1962, Ser. No. 207,869
16 Claims. (Cl. 266—13)

This invention relates to a system for supplying gas to a gas blast furnace or other user of high temperature, high pressure gas.

One feature of the invention is the use of a gas turbine engine as a producer of gas under pressure and at an elevated temperature for pressurizing the furnace inlets. Another feature is a simple arrangement for controlling the temperature of the gas delivered to the furnace.

It is well known that the conventional jet engine used for powering aircraft utilizes large volumes of air which are heated by the combustion of fuel in the engine and also raised to an elevated pressure, the hot gas being discharged from the thrust nozzle at a relatively high pressure and temperature. The turbine exhaust pressure is within the range of blast furnace inlet pressures and with the range of engine sizes available it is possible to select a size of engine or a combustion of engines suitable for each size of blast furnace. One feature of the invention is accordingly the use of a jet engine as a source of pressurized and heated gas for a blast furnace.

There is usually a coke furnace near a blast furnace installation that produces fuel gas as a by-product. One feature of the invention is the use of this coke furnace gas as the fuel for the gas turbine engine.

The turbine absorbs from the gas passing through the engine only enough energy for driving the compressor. Accordingly, the pressure delivered to the furnace may be controlled within limits by varying the quantity of fuel delivered to the engine. One feature of the invention is the control of the pressure of the gas delivered to the engine by controlling the supply of fuel to the engine.

One feature of the invention is the use of afterburning downstream of the turbine for additionally increasing the temperature of the gas delivered to the furnace. Thus the gas temperature may be adjusted precisely to the furnace requirements. Another feature of the invention is the delivery of a part of the gases discharging from the furnace to the turbine engine downstream of the turbine thereby reducing the quantity of fuel necessary for heating the gas to the desired temperature. This recirculation of heat requires a pump in the recirculating system. Accordingly, another feature of the invention is the use of a pump, a compressor driven from the turbine engine, as for example, through the accessory system for pressurizing the recirculated gas to the necessary pressure for returning it to the engine air system.

Other features and advantages will be apparent from the specification and claims, and from the accompanying drawings which illustrate an embodiment of the invention.

Figure 1:
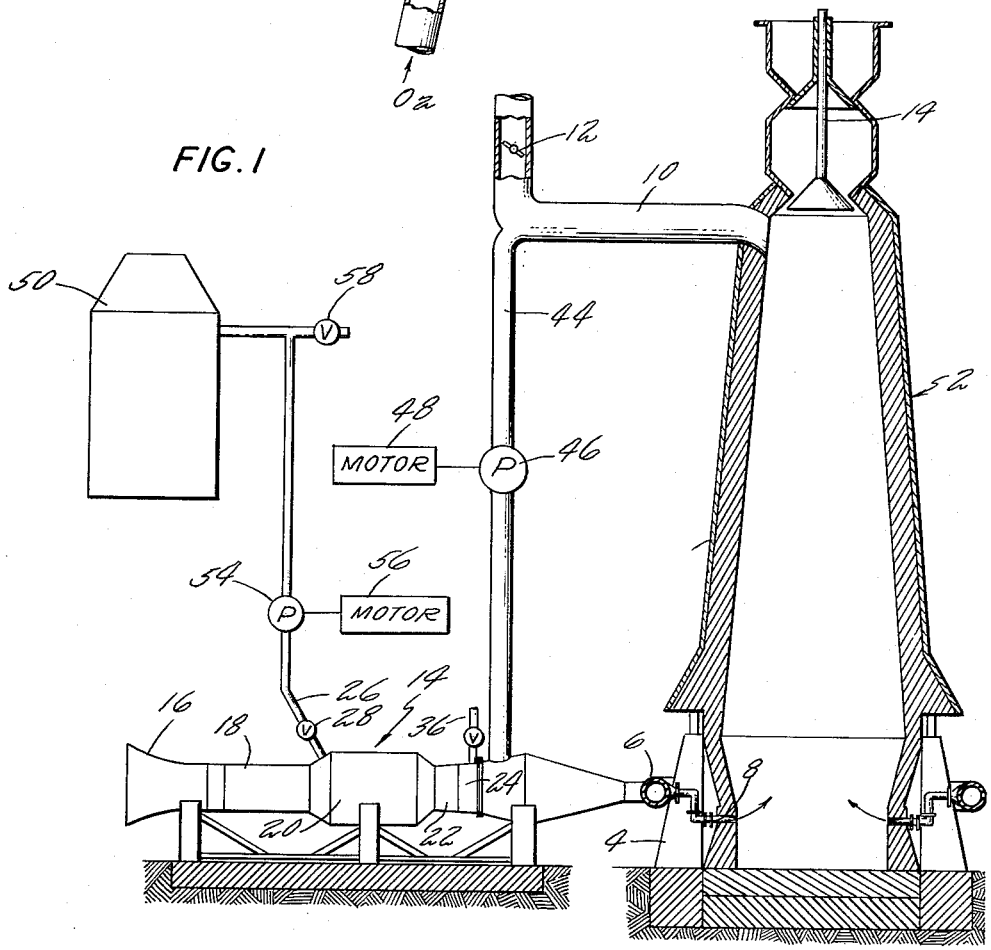
FIG. 1 is an elevation view of the system with parts in section.

Referring grst to FIG. 1, the blast furnace 2 is shown as the utilizer of pressurized and heated gas and to this end has a base 4 surrounded by a gas supply duct 6 communicating with the entry of the furnace through a plurality of inlets or tuyeres 8. The gas entering through these inlets passes up through the furnace and is discharged through a stack 10, the latter having a valve 12 therein for control of the flow of gas out the stack. A conventional charge feeding system 14 is shown for the introduction of the charge into the furnace.

It is well known that this type of furnace requires a large mass flow of hot gas through the furnace and, depending upon the type of furnace, may require that this gas be at an elevated temperature. For example, one type of furnace of this character might use as much as 115 cubic feet of air or gas per minute at 40 lbs. per square inch pressure at 1600°. To supply this, a jet engine used as a gas generator will provide without extensive modification the necessary volume at the desired temperature and pressures.

In the arrangement shown, the jet engine 14 includes an air inlet 16, a compressor portion 18, a combustion section 20 and a turbine section 22. The turbine receives hot gas from the combustion section and discharges into an exhaust duct 24 which communicates with the furnace supply duct 6. Fuel for the main combustion portion of the engine is supplied through a conduit 26 having a suitable fuel flow control represented by a valve 28. By controlling the quantity of fuel the speed of the jet engine may be controlled and, accordingly, the quantity of gas under pressure delivered to the furnace may be controlled.

Figure 2:
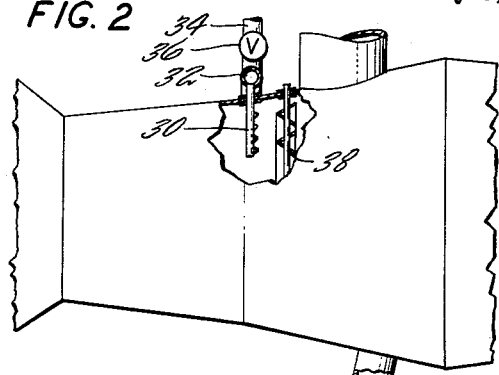
FIG. 2 is a fragmentary elevational view of a part of the engine system with a portion broken away to show particular details.

In the turbine exhaust duct 24, there are provided a plurality of spray bars 30, FIG. 2, supplied from a fuel annulus 32 which in return receives fuel from a supply duct 34 having a supply valve 36 therein. The control of the fuel by the valve 36 permits the control of the temperature of the gas entering the furnace since the fuel introduced by the spray bars 30 burns in the gas discharged from the turbine and will vary the temperature without any significant change in pressure of the gas. Suitable flameholders 38 of conventional construction facilitate the combustion of the fuel introduced by the spray bars. For maintaining the necessary quantity of oxygen in the gas entering the blast furnace, the exhaust duct 24 may also have an interconnected oxygen supply duct 40, FIG. 2, having a suitable control valve 42 therein. The oxygen for this duct is supplied from a suitable source of oxygen under pressure, such a source being conventional in blast furnace installations.

For reducing the quantity of fuel needed in the afterburner (the portion of the exhaust duct 24 in which the fuel introduced by the spray bars 30 is burned) there is a bypass duct 44 from the exhaust stack 10 to the turbine exhaust duct. It is necessary in order to have gas flow from the furnace stack into the afterburner or turbine exhaust duct that the pressure of the furnace gas be raised. Accordingly, a suitable pump 46, such as a centrifugal air compressor, is incorporated in the duct 44, being driven by any suitable arrangement such as a motor 48. Alternatively, the pump 46 might be driven from one of the accessory mountings on the jet engine.

The fuel for the gas turbine engine may be obtained from a coke oven 50 usually provided near a blast furnace installation as a source of coke for use in the blast furnace. The coke oven gives off a combustible gas which is directed through a conduit 52 to conduit 26. A compressor 54, driven by a motor 56, may be used to raise the pressure of the gas in conduit 52 to the necessary pressure for delivery into the combustion chamber. A suitable vent valve 58 allows the escape of any surplus fuel gas to avoid a pressure build up in the coke oven.

It is to be understood that the invention is not limited to the specific embodiment herein illustrated and described, but may be used in other ways without departure from its spirit as defined by the following claims.

We claim:

1. The combination with a furnace requiring a supply of gas under pressure, said furnace having inlets for said gas, of a gas turbine engine including a compressor, combustion chamber and turbine in which the discharge from the turbine is at the desired pressure for said supply of gas to the furnace, said turbine having an exhaust duct into which the gas from the turbine is discharged, and a fluid connection from said turbine exhaust duct to said furnace inlets for delivering turbine exhaust gas to the furnace.

2. The combination as in claim 1 in which the exhaust duct has fuel inlets for the introduction of fuel for afterburning to increase the temperature of the gas entering the furnace.

3. The combination as in claim 1 in which the compressor supplies air to the combustion chamber in which fuel is burned and hot gas from the combustion chamber is delivered to the turbine, and means for controlling the supply of fuel to the combustion chamber, the temperature of the gas entering the furnace being controlled at least in part by the quantity of fuel burned in the combustion chamber.

4. The combination as in claim 2 in which the furnace has an exhaust stack and in which a duct from the exhaust stack to the turbine exhaust duct delivers a part of the stack gas to the fuel inlets in the turbine exhaust for combustion therein.

5. The combination as in claim 4 in which a pump increases the stack gas pressure for discharge into the fuel inlets in the turbine exhaust duct.

6. The combination as in claim 4 in which an oxygen supply duct is connected to the exhaust duct and a valve in the supply duct controls the quantity of oxygen added to the turbine exhaust gas.

7. A gas blast furnace requiring a supply of hot gas under pressure and having an inlet for the hot gas and means for supplying hot gas at the temperature and pressure required including a compressor, a gas turbine driving the compressor, a combustion chamber into which air from the compressor is discharged and into which fuel is injected for combustion, the products of combustion powering the turbine, and a turbine exhaust duct into which gas from the turbine is discharged, said duct being connected to said furnace inlet for supplying turbine exhaust gas to the furnace.

8. A device as in claim 7 in which means are provided for controlling the fuel supply to the combustion chamber.

9. A device as in claim 7 in which means are provided for supplying additional fuel to the turbine exhaust duct for combustion therein to additionally heat the gas therein.

10. A device as in claim 9 in which valve means are provided for controlling the delivery of fuel to the turbine exhaust duct.

11. A device as in claim 9 in which the furnace has an exhaust stack, and the additional fuel supply means comprise a duct from said stack to the turbine exhaust duct for delivering a part of the gas from the stack to said exhaust duct.

12. A device as in claim 7 in which means are provided for supplying oxygen under pressure to said turbine exhaust duct.

13. In combination, a blast furnace requiring a supply of hot gas under pressure and having an inlet which receives the hot gas and an exhaust stack, a gas turbine engine including a compressor, a combustion chamber through which the compressed air from the compressor is delivered and a turbine receiving hot gas from the combustion chamber and driving the compressor, the turbine having an exhaust duct, means connecting said duct to the furnace inlet for discharge of the turbine exhaust gas directly to the inlet, a connector duct from the exhaust stack to the turbine engine for supplying combustible gas to said engine and valve means for controlling the quantity of gas from the exhaust stack that is delivered to the engine.

14. In combination, a blast furnace requiring a supply of hot gas under pressure and having an inlet which receives the hot gas and an exhaust stack, a gas turbine engine including a compressor, a combustion chamber through which the compressed air from the compressor is delivered and a turbine receiving hot gas from the combustion chamber and driving the compressor, the turbine having an exhaust duct, means connecting said duct to the furnace inlet for discharge of the turbine exhaust gas directly to the inlet, a connector duct from the exhaust stack to the turbine exhaust duct for supplying combustible gas for afterburning in said exhaust duct, pump means in said connector duct for increasing the pressure of the gas delivered to the exhaust duct and valve means upstream of the pump for controlling the quantity of combustible gas from the exhaust stack that is delivered to the engine.

15. In combination, a blast furnace requiring a supply of hot gas under pressure and having an inlet which receives the hot gas and an exhaust stack, a gas turbine engine including a compressor, a combustion chamber through which the compressed air from the compressor is delivered and a turbine receiving hot gas from the combusion chamber and driving the compressor, the turbine having an exhaust duct, means connecting said duct to the furnace inlet for discharge of the turbine exhaust gas directly to the inlet, a coke oven producing a combustible gas and a supply duct from said oven to said combustion chamber for supplying combustible gas to said combustion chamber and pump means in said supply duct for increasing the pressure of the combustible gas delivered to the combustion chamber.

16. In combination, a blast furnace requiring a supply of hot gas under pressure and having an inlet which receives the hot gas and an exhaust stack, a gas turbine engine including a compressor, a combustion chamber through which the compressed air from the compressor is delivered and a turbine receiving hot gas from the combustion chamber and driving the compressor, the turbine having an exhaust duct, means connecting said duct to the furnace inlet for discharge of the turbine exhaust gas directly to the inlet, a connector duct from the exhaust stack to the turbine exhaust duct for supplying combustible gas for afterburning in said exhaust duct, pump means in said connector duct for increasing the pressure of the gas delivered to the exhaust duct, valve means upstream of the pump for controlling the quantity of combustible gas from the exhaust stack that is delivered to the engine and means for supplying oxygen under pressure to said exhaust duct.

References Cited by the Examiner

Iron and Steel Engineer, 37 (1), January 1960; page 135, TS 300–165.

C. W. Dunn: Modern Blast Furnace Blowing and Gas Recovery Systems, in Iron and Steel Engineer, 39 (10); pages 109–120, October 1962, TS 300–165.

JOHN F. CAMPBELL, *Primary Examiner.*

JAMES H. TAYMAN, Jr., *Examiner.*